July 21, 1925.
S. JENCICK
SECONDARY BATTERY
Filed Oct. 2, 1920
1,546,541
2 Sheets-Sheet 1
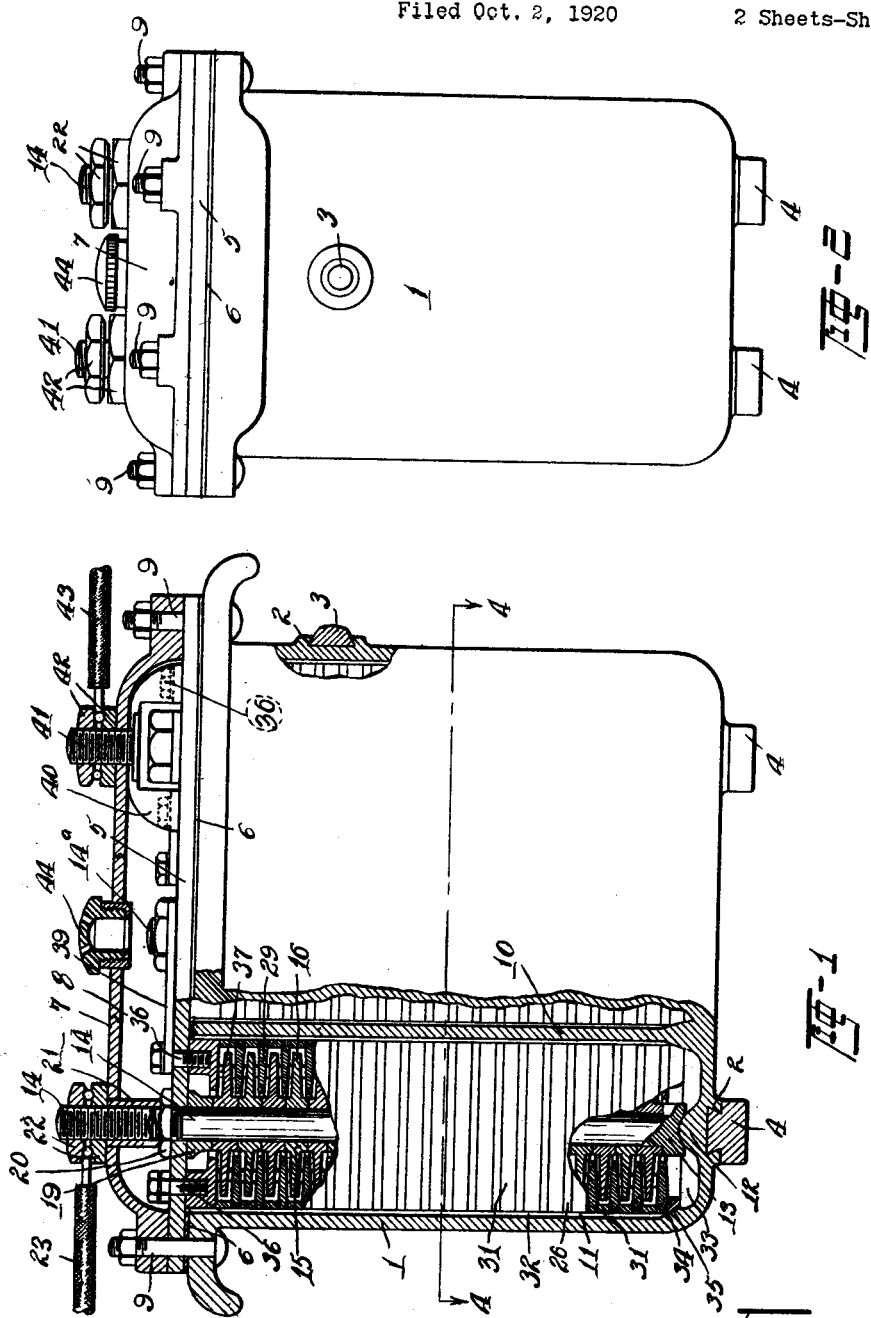
Inventor
Stephen Jencick
By Brockett & Hyde
Attys July 21, 1925.　　　　　　　　　　　　　　　　1,546,541
S. JENCICK
SECONDARY BATTERY
Filed Oct. 2, 1920　　　　　2 Sheets-Sheet 2
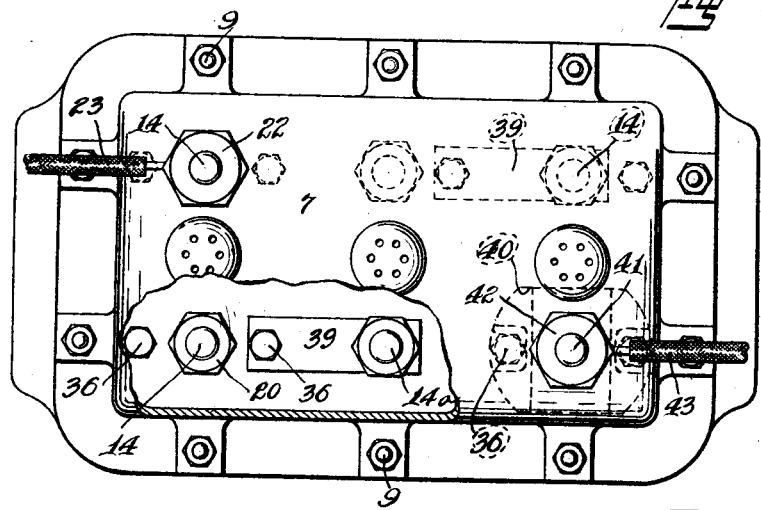
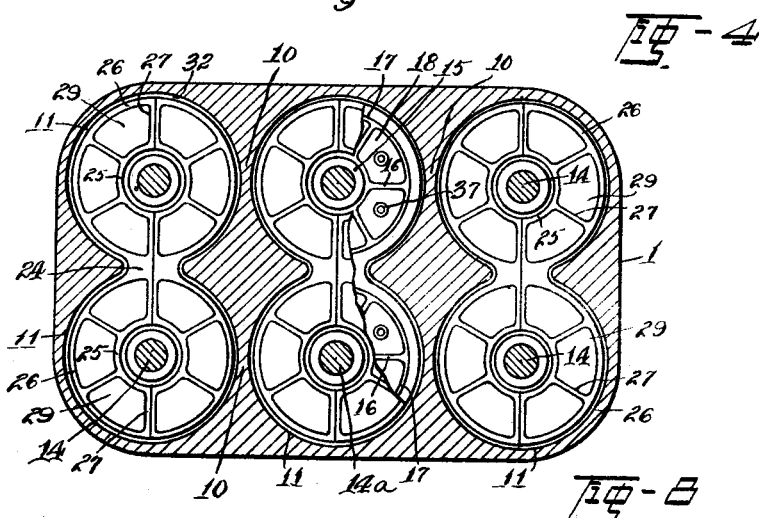
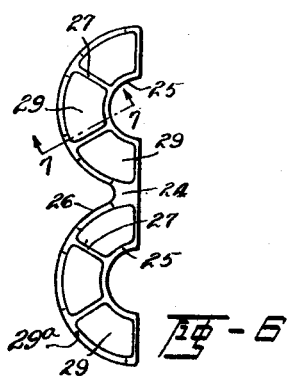
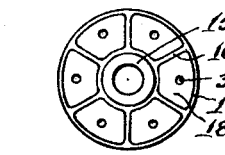
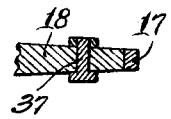
Inventor
Stephen Jencick
By Brockett & Hyde
Attys Patented July 21, 1925.

1,546,541

UNITED STATES PATENT OFFICE.

STEPHEN JENCICK, OF CLEVELAND, OHIO.

SECONDARY BATTERY.

Application filed October 2, 1920. Serial No. 414,219.

*To all whom it may concern:*

Be it known that I, STEPHEN JENCICK, a subject of the Government of Austria, residing at Cleveland, in the county of Cuyahoga and State of Ohio, have invented certain new and useful Improvements in Secondary Batteries, of which the following is a specification.

This invention relates to secondary batteries.

The object of the invention is to provide an improved battery of simple construction so arranged as to enable both the positive and negative plates to be readily withdrawn either for the purpose of replacement or for inspection and repair, and also to simplify the method of assembling the various parts of the battery in its initial construction.

Further objects of the invention are in part obvious and in part will appear more in detail hereinafter.

In the drawings, Fig. 1 represents a side elevation partly broken away and in section illustrating one suitable embodiment of the invention; Fig. 2 is an end view; Fig. 3 is a plan view partly broken away; Fig. 4 is a sectional plan view on the line 4—4 of Fig. 1, part of one of the negative plates being broken away to expose the underlying positive plates; Fig. 5 is a plan view of a positive plate; Fig. 6 is a plan view of a negative plate; Fig. 7 is a detail section on the line 7—7, Fig. 6; and Fig. 8 is a detail view of a spacing spool.

The battery shown in the drawings comprises an outer jar or casing or container 1 made of any suitable insulating material, such as rubber, porcelain, a composition or the like, but may be made of glass if desired. This jar may be cast with cavities 2 distributed upon its sides and bottom to receive cushioning rubber plugs 3, 4, as shown, to absorb shocks which might be received from surrounding objects such as the box containing the battery. The top of the casing is open and is provided with a flat peripherally extending surface upon which rests a flat horizontal wall 5, formed of insulating material, the joint being sealed by a gasket 6. This wall prevents the escape of the electrolyte or its passage from cell to cell and also serves as a support for the battery plates, as will appear. Above the wall 5 is located an inverted shallow dish-like cap or cover 7 also of insulating material, its cavity 8 serving to enclose the cell connections. The three members 1, 5 and 7 are suitably secured together such as by the bolts 9.

The battery may include any suitable number of cells and the drawings show a multiple cell arrangement. For this purpose the insulating casing 1 is provided with two upwardly extending cross walls 10 integral therewith, forming three cell chambers 11. These cell chambers, best shown in plan view in Fig. 4, are approximately of 8-shape in plan view, or in other words, the shape of two circles joined by a connecting neck, so that the electrolyte flows freely back and forth in each cell between the two substantially cylindrical portions thereof. At the center of the bottom of each cylindrical cell portion the floor of the casing is provided with a pad or pillow 12, on which is supported the lower end 13 of an upwardly extending shaft or post 14 which serves as the support for the positive plates and the electrical connection thereto. The positive plates of lead or other suitable material, and one of which is shown in Fig. 5, are of circular form, having central hub portions 15, radiating ribs 16 and a rim 17, the spaces between the hub, rim and ribs being filled with suitable plastic material, as for instance red lead indicated at 18. The spaces are filled by placing the plates upon a suitable support and applying the material thereto in a plastic state; after which the surplus material is removed in any convenient manner. The apertures 38 may be provided in any suitable manner. These wheel-like members are piled upon each other upon the central supporting post 14, as shown in Fig. 1. Above the upper one of said members in a head 19 lying just beneath the wall 5 and serving as an abutment to secure the shaft and positive plates to said wall by the nut 20 threaded upon the shaft. The upper end of the shaft extends through a bushing 21 to the outside of the cover 7 where it is provided with nuts 22 for clamping the lead wire 23.

The negative plates, one of which is shown in Figs. 6 and 7, are in plan view of the form of two semi-circles connected by a neck 24. They include a lead or suitable metal frame consisting of a hub 25, rim 26 and ribs 27, all of which are undercut as at 28 to support and hold the negative plastic material 29, as for instance litharge. The plastic material is applied by placing the frame, shown in Figs. 6 and 7 in a suitable form and then inserting the plastic material through the slots 29ª which extend through the rim portions 26. The tapered or beveled form of the negative plates facilitates their removal from the form without scraping off the plastic material and lends also to the strength of the plates. The various negative plate members are piled upon each other and surround each pair of shaft members 14, as shown in Fig. 4, successive negative plates being separated at their peripheries by the separating conducting members 31. The negative plates are so proportioned as to be slightly smaller than the dimensions of the cell chambers, so that a space 32 is left around the plates for the circulation of the electrolyte. A similar space 33 lies beneath the bottom plate, which is specially formed with a beveled flange 34 resting upon a beveled portion 35 of the casing.

The uppermost negative plate is of special form to receive a series of holding screws or bolts 36 for securing it to the supporting wall 5. 37 represents a series of spool-like non-conducting separators which are located in openings 38 of the positive plates and which serve to properly space the negative and positive plates from each other and prevent them from touching as the result of vibration or warping or for other causes. These spools may be inserted in the holes 38 in any convenient manner; as for instance by forming one of its heads as a separate apertured disk which receives the end of the shank after being inserted through the aperture of the plate. (See Fig. 8.) These parts will be held in position by the piled arrangement of the plates. (See Fig. 1.) Bolts 36 also serve as the connections for the electrical circuit. For example, one of the bolts 36 may be connected by a bar 39 to the post 14ª of the second cell. Connection to the third cell is made in the same manner and the negative plates of the third cell have their upper member connected by bolts 36 to an arched conducting member 40 which in turn is connected to a stub shaft 41 on which are threaded the nuts 42 for connection of the lead wire 43.

44 indicates one of the usual threaded caps in the cover 7 through which water may be introduced into the cells, as desired. Several such caps may be used if desired.

The arrangement described enables the cell to be readily assembled or disassembled. By removing all the bolts 9 the cover and wall 5 may be removed, together with the several positive and negative plates carried with them. By also separating the cover and wall 5 the nuts 20 may be removed so as to enable the plate supporting posts or shafts to be disconnected from the wall 5 after which the negative plates can be pulled out laterally from between the positive plates. All parts of the battery are therefore readily accessible when desired.

What I claim is:—

1. In a secondary battery, a battery plate of substantially 8-shape in plan view provided with an opening at the center of each of the contiguous approximately circular portions to receive a supporting post.

2. In a secondary battery, a battery plate of substantially 8-shape in plan view provided with an opening at the center of each of the contiguous approximately circular portions to receive a supporting post, said plate being divided into two parts along a plane perpendicular to said plate and through said openings.

3. A secondary battery, comprising a jar having a cell chamber therein, a horizontal wall, a post depending from said wall, and a series of horizontal plates supported by said post and having circular portions concentric therewith.

4. A secondary battery, comprising a jar having a cell chamber therein, a horizontal wall, a post depending therefrom, and a series of horizontally disposed alternating positive and negative plates supported by said posts and having circular portions concentric therewith, one series of plates being of two-part form, and being removable from between the other series of plates by horizontal movement when the plates are out of the jar.

5. A secondary battery, comprising a jar having a cell chamber therein, a horizontal wall, two posts depending from said wall, and two series of horizontal battery plates of 8-shape in plan view, each plate having an opening at the center of its contiguous circular portions to receive said posts.

6. A secondary battery, comprising a jar having a cell chamber therein, a horizontal wall, two posts depending from said wall, two series of horizontal battery plates of 8-shape in plan view, each plate having an opening at the center of its contiguous circular portions to receive said posts, and alternate plates being divided along a plane through the axes of said posts to enable them to be separated from the other plates by horizontal motion.

7. A secondary battery comprising a jar having a cell chamber therein, a horizontal wall, a post depending from said wall and a series of horizontal plates removably supported by said post and having circular portions concentric therewith.

8. A secondary battery, comprising a jar having a cell chamber therein, a horizontal wall, a post depending from said wall, and a series of horizontal plates removably supported about said post and having circular portions concentric therewith.

In testimony whereof I hereby affix my signature.

STEPHEN JENCICK.